(12) United States Patent
Rosen

(10) Patent No.: US 7,841,542 B1
(45) Date of Patent: Nov. 30, 2010

(54) SYSTEM FOR SUPPLYING COMMUNICATIONS AND POWER TO A THERMOSTAT OVER A TWO-WIRE SYSTEM

(76) Inventor: Howard Rosen, 1 Lyncroft Road, Montreal, Quebec (CA) H3X 3E3

( * ) Notice: Subject to any disclaimer, the term of this patent is extended or adjusted under 35 U.S.C. 154(b) by 693 days.

(21) Appl. No.: 11/557,492

(22) Filed: Nov. 7, 2006

(51) Int. Cl.
*G05D 23/00* (2006.01)
*G05D 23/19* (2006.01)

(52) U.S. Cl. .................. 236/51; 236/91 E; 700/276
(58) Field of Classification Search .............. 236/51, 236/1 C, 91 D, 91 E, 91 G; 700/276
See application file for complete search history.

(56) References Cited

U.S. PATENT DOCUMENTS

| | | | | |
|---|---|---|---|---|
| 2,810,870 A | * | 10/1957 | Tucker et al. | 257/47 |
| 3,292,687 A | * | 12/1966 | Evans | 165/255 |
| 3,302,193 A | * | 1/1967 | Sipress | 341/57 |
| 3,464,225 A | * | 9/1969 | Harnden, Jr. et al. | 62/156 |
| 3,702,064 A | * | 11/1972 | Ciolli | 62/158 |
| 4,333,316 A | * | 6/1982 | Stamp et al. | 62/126 |
| 5,140,611 A | * | 8/1992 | Jones et al. | 375/219 |
| 5,192,874 A | * | 3/1993 | Adams | 307/125 |
| 5,203,497 A | * | 4/1993 | Ratz et al. | 236/46 R |
| 5,209,075 A | * | 5/1993 | Kim | 62/126 |
| 5,661,480 A | * | 8/1997 | Vallancourt | 341/118 |
| 5,694,109 A | | 12/1997 | Nguyen et al. | |
| 5,742,225 A | | 4/1998 | Wetzel et al. | |
| 6,097,761 A | | 8/2000 | Buring et al. | |
| 6,320,494 B1 | | 11/2001 | Bartels et al. | |
| 6,377,377 B1 | * | 4/2002 | Gehlot | 398/140 |
| 6,708,083 B2 | * | 3/2004 | Orthlieb et al. | 700/276 |
| 6,731,126 B2 | | 5/2004 | Plummer | |
| 6,956,463 B2 | | 10/2005 | Crenella et al. | |
| 7,562,830 B2 | * | 7/2009 | Orozco | 236/1 C |

* cited by examiner

*Primary Examiner*—Henry Yuen
*Assistant Examiner*—Alexis K Cox
(74) *Attorney, Agent, or Firm*—Marc E. Hankin; Kevin Schraven; Hankin Patent Law, APC

(57) ABSTRACT

One embodiment of the invention discloses a system for supplying power and data to and receiving data from a thermostat over a two-wire system. The invention allows modern thermostats that feature digital communications to be installed in two-wire systems, such as conventional older technology thermostat systems. In this manner, one or more embodiments of the invention disclose systems for simplifying and reducing costs associated with upgrading conventional older technology HVAC systems to accommodate modern thermostat technologies.

6 Claims, 3 Drawing Sheets

SYSTEM FOR SUPPLYING COMMUNICATIONS AND POWER TO A THERMOSTAT OVER A TWO-WIRE SYSTEM

FIELD OF INVENTION

Various embodiments of this invention relate, generally, to communications systems for thermostats; more particularly, to communications systems for thermostats that allow digital information and power to be transmitted over a two-wire system to and from a thermostat.

BACKGROUND OF THE INVENTION

The art of heating, ventilating, and air conditioning (HVAC) system design has employed thermostats for many years in order to operate as a temperature sensitive switch to turn on or off and/or adjust other parameters on HVAC equipment. In the common manner in the art, a simple thermostat can be adjusted to establish a temperature set point such that, when the temperature in the conditioned space reaches the set point, the thermostat interacts with the HVAC equipment to take suitable action to heat or cool the conditioned space as may be appropriate.

Older generation, simple thermostats employed a temperature sensitive switch, such as a mercury switch, in order to make or break a circuit and, thereby, activate or deactivate HVAC equipment. Because of their relatively simple technology, these older generation thermostats did not require complicated building wiring and usually operated on a simple, two-wire system.

Modern HVAC systems offer numerous improvements to climate control in comparison to older systems. Modern thermostats, for example, offer many conveniences such as programmable temperature settings, timed activation/deactivation, and other such modern advances that were not available in older generation systems. Because of the increased complexity of modern HVAC systems, modern thermostats typically require four or more wires in order to operate. Two of these wires are commonly used to supply power to the thermostat while two or more other wires are commonly used for communications and/or data transfer with HVAC equipment.

A problem, thus, arises when retrofitting older buildings to install modern thermostats in buildings with older two-wire systems in place. New wiring, including more conductors, may be added to the systems in order to allow the newer equipment to operate. The conventional solution of removing the two-wire system and running new wiring to accommodate the newer thermostat, however, is undesirable as it is both expensive and time consuming. Thus, climate control manufacturers have sought means to operate modern thermostats using a two-wire system.

One such means is disclosed by U.S. Pat. No. 6,956,463 to Crenella et al. Crenella's patent discloses a method and apparatus that allows both power and communications to be conducted over a two-wire system between multiple low-voltage systems, such as thermostats. Crenella's method and apparatus operates, generally speaking, by using a two-wire system to supply AC power to the thermostat while replacing each half-cycle of the power transmission with a data transmission. In this manner, Crenella's device allows both power and communications to be supplied to a thermostat over a two-wire system. Crenella's system, however, does not support DC-powered thermostats because it relies upon the half-cycle of an AC power line to transmit the data.

Certain devices have also been directed to operating DC-powered thermostats over a two-wire system. U.S. Pat. No. 5,694,109 to Nguyen et al., for example, discloses a two-wire DC communications system that operates by using voltage variations in order to provide communications. Another such device is disclosed by U.S. Pat. No. 6,320,494 to Bartels et al., which discloses a two-way communications system over a pair of wires. A shunt placed within Bartels' circuit creates current variations that are detected by a microprocessor in the system. Bartels' system, however, creates variations in current through the shunt, and does not completely turn the current on and off.

Thus, there remains a long felt need in the art for a system that connects communications and DC-power to a modern thermostat through a conventional two-wired system by interrupting DC-current, rather than varying the amount of current.

BRIEF SUMMARY OF THE INVENTION

One embodiment of the invention is directed towards overcoming the above shortcomings through an improved means to supply both DC-power and communications to a modern thermostat through a conventional two-wire system.

In one embodiment of the invention, the system operates by supplying DC-power to the thermostat from an HVAC-controller through the two-wire system. The communications between the thermostat and the HVAC-controller is achieved by interrupting the power supplied to the thermostat in logical sequences. Specifically, the thermostat communicates with an HVAC-controller along the two-wire system and transmits digital code to the HVAC-controller by creating interruptions in the DC current. These interruptions are, in turn, detected and decoded by a microprocessor on the HVAC-controller that processes the signals.

In another embodiment of the invention, the HVAC-controller further supplies data to the thermostat, and this data is modulated onto the DC-power signal through interruptions in the current. Thus, this further embodiment of the invention allows two-way communications between thermostats and HVAC-controllers.

One or more embodiments of the invention use a well-regulated power supply to maintain a constant voltage to the thermostat. Thus, power interruptions are detected as interruptions in the current that may be demodulated and used as code to facilitate communications between the thermostat and HVAC equipment and vice versa.

Various embodiments of the invention improve upon the related-art systems discussed above. Various embodiments of the invention, for example, use DC-power, rather than AC-power, as disclosed by Crenella et al. Various embodiments of the invention also use interruptions in current, rather than variations in voltage, as disclosed by Nguyen et al. Finally, various embodiments of the invention avoid the use of 2 impedances which cause current variations, as disclosed by Bartels et al. and, rather, use complete interruptions in current in order to transmit data signals. Thus, by using the system of interruptions, the system of the current invention is distinguishable from these related-art patents.

In one or more embodiments of the invention, the DC current modulation is achieved by connecting one of the two wires used to supply DC power to the thermostat in series with a Collector and Emitter of a PNP-transistor. One or more than one PNP-transistors may be used, each of which features a collector, an emitter, and a base terminal. The Base of the transistor is then connected to the data bus in the thermostat. Thus, digital data supplied to the Base causes the transistor to interrupt current to the thermostat. In this manner, the current on the line is modulated to reflect the digital data. This configuration, thus, facilitates communications and data transfer between the thermostat and HVAC equipment without the need for additional conductors. One or more capacitors may be used in the power supply of various embodiments of the invention in order to maintain continuous power to the thermostat, despite the interruptions in power. Two PNP-transistors may be used to modulate and demodulate the interruptions to the DC-power at the thermostat and controller to allow the exchange of data between a first and a second microprocessor.

The HVAC-controller features a microprocessor that detects the interruptions in the current. In one embodiment of the invention this can be achieved by adding a resistive element anywhere in series with the two-wire power source, and by reading, across this resistive element, the current interruptions, which are translated into data and communications. The microprocessor on the HVAC-controller further decodes these interruptions, and is able to convert them back into digital code. The digital code then allows the HVAC-controller to receive input from the thermostat and to control other HVAC equipment, according to the input. Accordingly, the system allows data transmissions from the thermostat to the HVAC controller board along the two-wire system.

In yet another embodiment of the invention, the power supply in the HVAC-controller may incorporate the same circuit as that in the thermostat, to cause detectable current interruptions to the thermostat, which the thermostat can demodulate. This variation of this embodiment allows two-way communications via interruptions of the DC-power supply that are detected as interruptions of the current.

In one embodiment of the invention, the data code is transmitted in a redundant manner to allow error correction. The HVAC-controller reads the redundant transmissions and incorporates "majority voting" or "forward error correcting" for robustness and reliability of the system.

It remains within the contemplation of the current invention to be used with varying thermostats, HVAC equipment, HVAC-controllers, and other such equipment known in the art.

DETAILED DESCRIPTION OF THE DRAWINGS

In the following detailed description of various embodiments of the invention, numerous specific details are set forth in order to provide a thorough understanding of various aspects of one or more embodiments of the invention. However, one or more embodiments of the invention may be practiced without these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive. Also, the reference or non-reference to a particular embodiment of the invention shall not be interpreted to limit the scope of the invention.

In the following description, certain terminology is used to describe certain features of one or more embodiments of the invention. For instance, "thermostat" refers to any of various electronic thermostats, electro-mechanical thermostats, programmable thermostats, digital thermostats, touch-screen thermostats, universal thermostats, or other such devices for maintaining the temperature of a system; "HVAC equipment" refers to any Packaged Terminal Air Conditioning (PTAC) unit, Mini-Split Unit, combination heat-pump/air conditioner, heat pump, air conditioner, fan, boiler, furnace, fan coil unit, fan assisted radiator, HVAC-controller, or other such climate control equipment known in the art; and "HVAC-controller" refers to one or more circuits employing a microprocessor used for controlling the operation of HVAC equipment.

Figure 1:
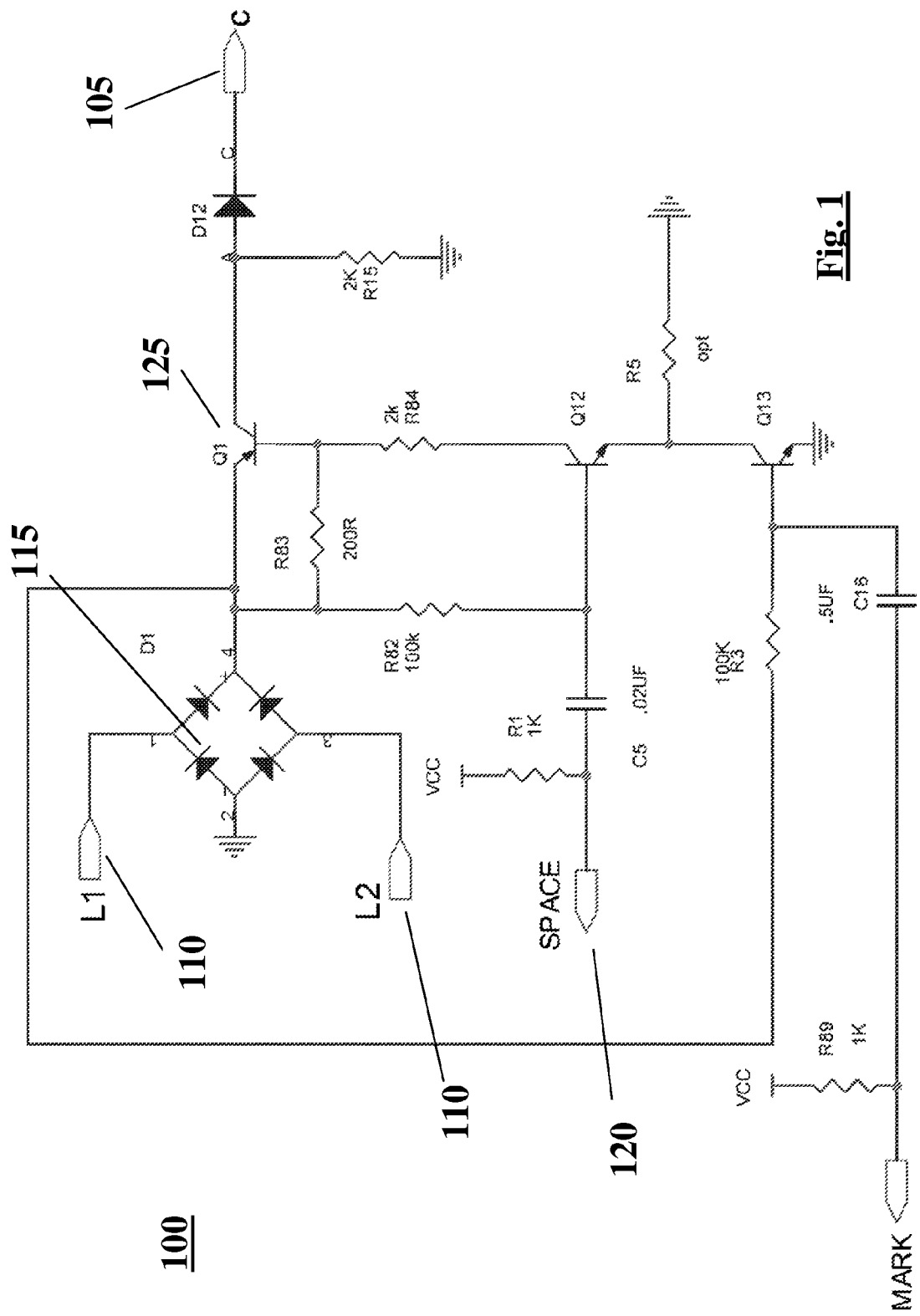
FIG. 1 is a circuit diagram that illustrates the thermostat circuit in various embodiments of the invention.

FIG. 1 is a circuit diagram that illustrates the thermostat circuit in various embodiments of the invention. A circuit 100 is illustrated that may be used in thermostats in various embodiments of the invention. Two points 110 on the circuit 100 are connected by dual conductors to the transmitter unit. A full-wave rectifier 115 follows the connection points at 110. The full-wave rectifier 115 provides the same polarity of output voltage, regardless of the polarity of the input voltage. Thus, the two points 110 may be connected to either polarity. The transistor 125 functions to interrupt the power supply received at its Collector depending on a signal from a microprocessor received at its Base from point 120. In this manner, the transistor 125 functions to modulate data signals as interruptions in the power supply from the controller.

Figure 2:
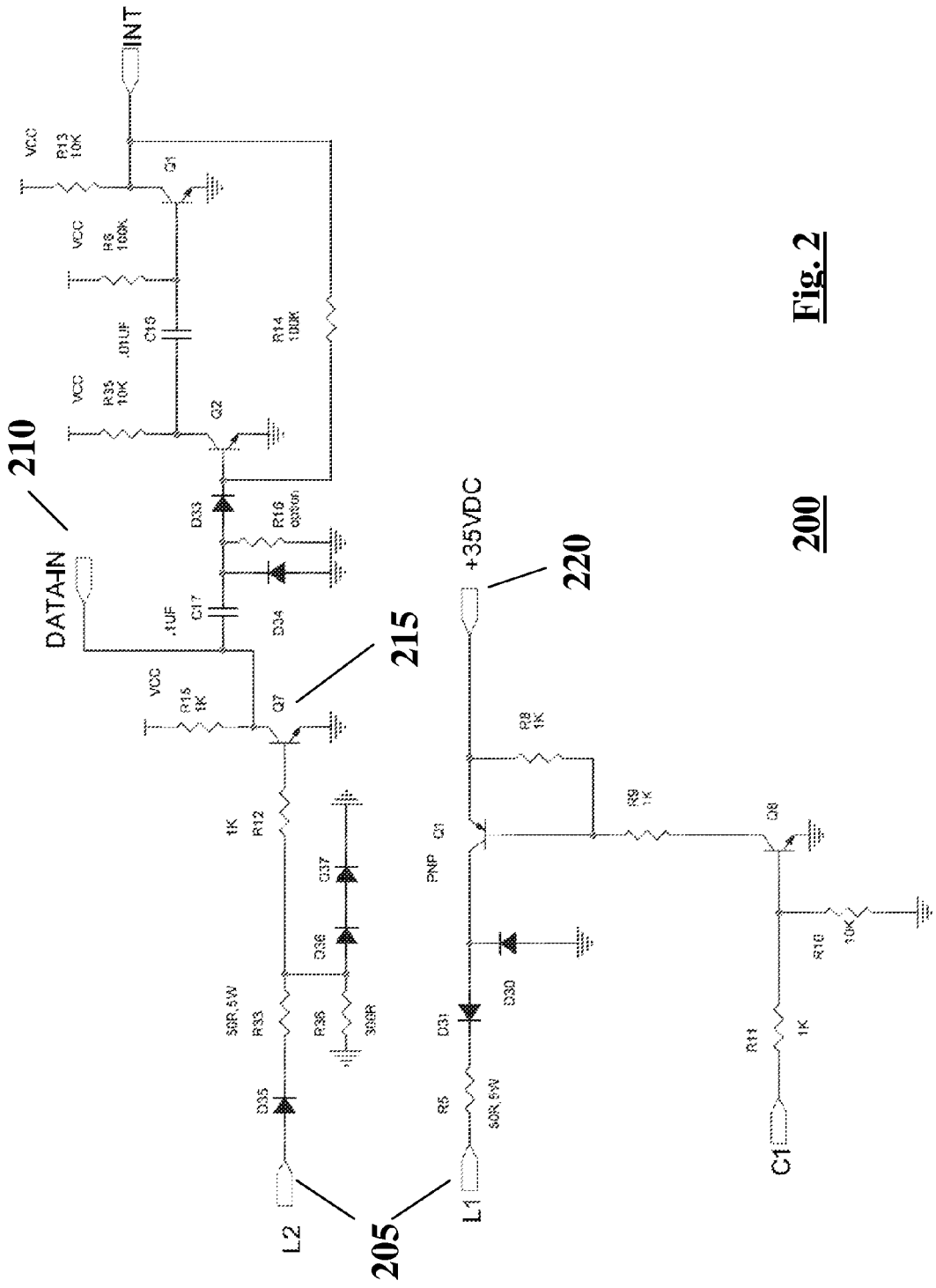
FIG. 2 is a circuit diagram that illustrates the HVAC Controller circuit in various embodiments of the invention.

FIG. 2 is a circuit diagram that illustrates the HVAC-controller circuit in various embodiments of the invention. A circuit 200 is illustrated that may be used with HVAC-controllers in various embodiments of the invention. Along the circuit 200, 205 represents the point at which the HVAC-controller is connected to the thermostat. A 35-Volt DC-power source 220 is supplied to the thermostat. The transistor 215 performs the demodulating function to translate the interruptions in the signal to the thermostat as digital data. The digital data is supplied to a microprocessor in the HVAC-controller from the point 210 in the circuit 200.

Figure 3:
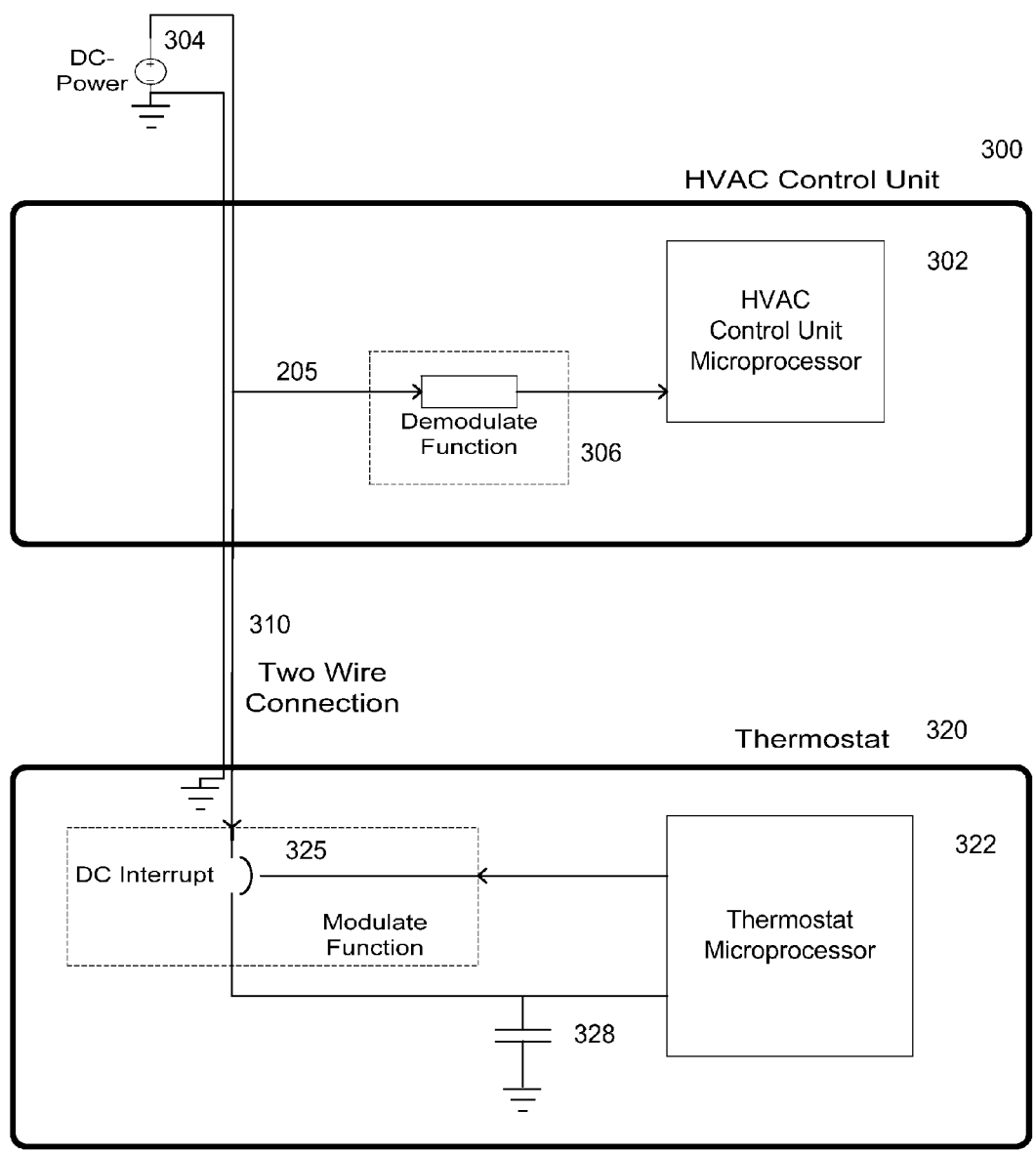
FIG. 3 is a block diagram of a conventional two-wire system that incorporates an illustrated embodiment of the present invention.

FIG. 3 is a block diagram of a conventional two-wire system 30 that incorporates an illustrated embodiment of the present invention. As shown, the system 30 includes a control unit shown as an HVAC control unit 300 and a thermostat 320 connected as shown. The control unit 300 is representative of an HVAC controller which may include circuitry illustrated in exemplary FIG. 2 described above. The thermostat block is representative of a thermostat which includes circuitry illustrated in exemplary FIG. 1 described above.

The control unit 300 is supplied with DC power from an .external DC power source 304 and then supplied (forwarded) to the thermostat 320 over a two-wire conductive path 310 as shown. The HVAC Control Unit 300 includes a first microprocessor 302 and the thermostat 320 includes a second microprocessor 322. According to the illustrated embodiment, a transistor circuit 325 is connected in series with the two-wire conductive path 310 for interrupting DC power supplied from the HVAC Control Unit to the thermostat so as to perform a modulate function which enables data to be sent from the thermostat microprocessor 322 of the thermostat to the microprocessor 302 of the HVAC Control unit 300. The HVAC control unit 300 further includes a transistor circuit that performs a demodulate function 306 which is connected to the two-wire conductive path 310 in exemplary manner to detect data sent from the thermostat 320 and to then provide such data to the HVAC Control Unit Microprocessor 302. The thermostat 320 may further include a capacitor 328 connected to ground potential as shown for maintaining continuous power to the thermostat despite interruptions in DC power provided from the HVAC Control Unit.

What is claimed is:

1. A system for supplying operational power to and receiving data from a thermostat, comprising:

a controller unit, said controller unit supplying operational DC-power to said thermostat and including a first microprocessor, said thermostat being connected for receiving the operational DC-power from said controller unit, said thermostat including a second microprocessor operably connected for supplying data to said controller unit by interrupting the operational DC-power supplied from said controller unit, and said thermostat supplying data from the second microprocessor to said controller unit through interruptions in the operational DC-power that produce modulations at the thermostat which are demodulated at the controller unit and received at the first microprocessor.

2. The system according to claim 1, wherein said controller unit comprises an HVAC-controller unit.

3. The system according to claim 1 further comprising:

a PNP-transistor at said thermostat, said PNP-transistor including a collector, emitter, and base terminal, said collector and emitter terminals being connected to said operational DC-power supplied from said controller unit and placed in series with the operational DC-power supplied from said controller unit enabling the transistor to act as a switch, said base terminal being connected to a data bus included in said second microprocessor enabling, data from said data bus in said second microprocessor to create interruptions in conductance between the collector and emitter terminals of said DC-power such that data being applied to the base terminal is modulated as interruptions in current of said operational DC-power.

4. A system for supplying power to and receiving data from a thermostat over two wires, comprising:

an HVAC-controller unit, said HVAC-controller unit supplying operational DC-power to said thermostat over the two wires and including a first microprocessor, said thermostat being connected for receiving operational DC-power over the two wires from said controller unit, said thermostat including a second microprocessor operably connected for supplying data over the two wires to said controller unit by interrupting the operational DC-power supplied from said controller unit, said thermostat supplying data from the second microprocessor to said controller unit on said operational DC-power through interruptions in the operational DC-power that produce modulations at the thermostat which are demodulated at the controller unit and received at the first microprocessor, a PNP-transistor at said thermostat, said PNP-transistor featuring a collector, an emitter, and a base terminal, said collector and emitter terminals being connected to said operational DC-power source and placed in series to act as a switch, and said base terminal being connected to a data bus of said second microprocessor, such that data from said data bus in said second microprocessor is modulated through interruptions in the conductance to said operational DC-power source such that data is modulated as interruptions in the current of said operational DC-power.

5. The system according to claim 1, wherein said data is transmitted a plurality of times and, further, wherein the controller as recipient of said plurality of data transmissions further includes an error correction system that enables the data transmissions to be only acted upon when a majority of the received transmissions dictates a given command.

6. The system according to claim 4, wherein said data is transmitted a plurality of times and, further, wherein the recipient of said plurality of data transmissions employs an error correction system such that data transmissions are acted upon only when a majority of the received data transmissions dictates a given command.

* * * * *